(12) United States Patent
Shiraki et al.

(10) Patent No.: US 11,850,739 B2
(45) Date of Patent: Dec. 26, 2023

(54) ROBOT CONTROL DEVICE, MAINTENANCE MANAGEMENT METHOD, AND MAINTENANCE MANAGEMENT PROGRAM

(71) Applicant: OMRON Corporation, Kyoto (JP)

(72) Inventors: Teruyuki Shiraki, Kyotanabe (JP); Maki Endo, Kyoto (JP); Yasumoto Mori, Kyoto (JP)

(73) Assignee: OMRON Corporation, Kyoto (JP)

( * ) Notice: Subject to any disclaimer, the term of this patent is extended or adjusted under 35 U.S.C. 154(b) by 237 days.

(21) Appl. No.: 17/046,801

(22) PCT Filed: Feb. 22, 2019

(86) PCT No.: PCT/JP2019/006683
§ 371 (c)(1),
(2) Date: Oct. 12, 2020

(87) PCT Pub. No.: WO2019/215993
PCT Pub. Date: Nov. 14, 2019

(65) Prior Publication Data
US 2021/0078187 A1 Mar. 18, 2021

(30) Foreign Application Priority Data
May 8, 2018 (JP) .................... 2018-089962

(51) Int. Cl.
*G05B 19/4065* (2006.01)
*B25J 19/00* (2006.01)
*B25J 9/16* (2006.01)

(52) U.S. Cl.
CPC ......... *B25J 19/0066* (2013.01); *B25J 9/1674* (2013.01); *G05B 19/4065* (2013.01); *G05B 2219/39413* (2013.01)

(58) Field of Classification Search
CPC . B25J 19/0066; B25J 9/1674; G05B 19/4065; G05B 2219/39413
See application file for complete search history.

(56) References Cited

U.S. PATENT DOCUMENTS

| | | | |
|---|---|---|---|
| 2004/0199348 A1 | 10/2004 | Hitchcock et al. | |
| 2008/0215292 A1 | 9/2008 | Kato et al. | |
| 2014/0007657 A1* | 1/2014 | Matsubara | G01N 27/221 73/53.05 |

FOREIGN PATENT DOCUMENTS

| | | |
|---|---|---|
| CN | 103176410 | 6/2013 |
| CN | 106003147 | 10/2016 |

(Continued)

OTHER PUBLICATIONS

"International Search Report (Form PCT/ISA/210) of PCT/JP2019/006683", dated Apr. 23, 2019, with English translation thereof, pp. 1-4.

(Continued)

*Primary Examiner* — John E Breene
*Assistant Examiner* — Xiuqin Sun
(74) *Attorney, Agent, or Firm* — JCIPRNET

(57) ABSTRACT

A deterioration degree of a robot body is precisely evaluated. A robot control device 300 includes: a drive control unit 309 controlling operation of a robot body 200; a detection unit 310 detecting a signal used for analysis of a feature amount quantitatively indicating a deterioration degree of the robot body 200 deteriorated over time as the robot body 200 is operated; a determination unit 304 determining whether a data section of the signal includes a constant speed section equal to or greater than a given section; a normalization unit 305 normalizing a signal in a non-constant speed section when the data section of the signal does not include the constant speed section equal to or greater than the given section; an analysis unit 307 analyzing the feature amount;

(Continued)

and an estimation unit 308 estimating a remaining life of the robot body 200 based on the feature amount.

7 Claims, 6 Drawing Sheets

(56) References Cited

FOREIGN PATENT DOCUMENTS

| DE | 60218169 T2 * | 10/2007 | ............ G01H 1/003 |
|----|---------------|---------|-------------------------|
| EP | 1405047 | 4/2004 | |
| EP | 1882922 | 1/2008 | |
| JP | H07311082 | 11/1995 | |
| JP | 110221217 | 8/1998 | |
| JP | 2002048633 | 2/2002 | |
| JP | 2015034776 | 2/2015 | |
| JP | 2016117148 | 6/2016 | |
| JP | 6144404 | 6/2017 | |

OTHER PUBLICATIONS

"Written Opinion of the International Searching Authority (Form PCT/ISA/237) of PCT/ JP2019/006683", dated Apr. 23, 2019, with English translation thereof, pp. 1-8.

"Search Report of Europe Counterpart Application", dated Jan. 11, 2022, p. 1-p. 10.

Office Action of China Counterpart Application, with English translation thereof, dated Feb. 13, 2023, pp. 1-18.

* cited by examiner

ROBOT CONTROL DEVICE, MAINTENANCE MANAGEMENT METHOD, AND MAINTENANCE MANAGEMENT PROGRAM

CROSS-REFERENCE TO RELATED APPLICATION

This application is a 371 application of the International PCT application Ser. No. PCT/JP2019/006683, filed on Feb. 22, 2019, which claims the priority benefit of Japan Patent Application No. 2018-089962, filed on May 8, 2018. The entirety of each of the above-mentioned patent applications is hereby incorporated by reference herein and made a part of this specification.

BACKGROUND

Technical Field

The present invention relates to a robot control device, a maintenance management method, and a maintenance management program.

Related Art

In a production line that manufactures industrial products, plural robots operate in cooperation with each other, and thus, even if one robot fails, the production line may stop. For example, in a robot configured to amplify an output torque of a motor by using a speed reducer and transmit the amplified torque to an arm, if progress of aging deterioration of a drive system (for example, wear of a gear mechanism of the speed reducer or the like) is left unattended, malfunction may occur. Because it takes a long time to repair a robot, a remaining life until the robot fails is desirable to be predicted as accurately as possible from the viewpoint of avoiding a long stoppage of the production line. In view of this circumstance, patent literature 1 (Japanese Patent Laid-Open No. 2016-117148) proposes a method of calculating an expected elapsed time until a current command value reaches a predetermined threshold value and estimating the remaining life from the expected elapsed time, from a future change tendency of the current command value of the motor that drives the arm.

SUMMARY

However, when the arm performs a non-constant speed operation, there is a problem that a measured value of the current command value apparently changes and the remaining life cannot be accurately estimated.

Thus, an object of the present invention is to propose a technique capable of solving this problem and precisely evaluating a deterioration degree of a robot body.

In order to solve the aforementioned problem, a robot control device according to the present invention includes: a drive control unit that controls operation of a robot body; a detection unit that detects a signal used for analysis of a feature amount quantitatively indicating a deterioration degree of the robot body that is deteriorated over time as the robot body is operated; a determination unit that determines whether a data section of the detected signal includes a constant speed section that is a data section obtained by a constant speed operation of the robot body and that is equal to or greater than a given section; a normalization unit that normalizes, when the data section of the detected signal does not include the constant speed section equal to or greater than the given section, a signal in a non-constant speed section which is a data section obtained by a non-constant speed operation of the robot body in the data section of the detected signal; an analysis unit that analyses, when the data section of the detected signal includes the constant speed section equal to or greater than the given section, the feature amount quantitatively indicating the deterioration degree of the robot body based on the signal in the constant speed section, and analyses, when the data section of the detected signal does not include the constant speed section equal to or greater than the given section, the feature amount quantitatively indicating the deterioration degree of the robot body based on the normalized signal in the non-constant speed section; and an estimation unit that estimates a remaining life of the robot body based on the analysed feature amount. Accordingly, whether the constant speed section included in the data section of the detected signal is equal to or greater than the given section is determined, and when the constant speed section is shorter than the given section, the data section to be normalized can be limited to a necessary range by normalizing the signal in the non-constant speed section. In addition, when the constant speed section included in the data section of the detected signal is equal to or greater than the given section, the deterioration degree of the robot body can be precisely evaluated based on the signal in the constant speed section in which an apparent change caused by the non-constant speed operation of the robot body does not occur.

The given section is a data section required to detect one period of a periodic change in the feature amount that is linked to the operation of the robot body. Thereby, information of the feature amount necessary for evaluating the deterioration degree can be obtained without any shortage.

The normalization unit may resample the signal in the non-constant speed section at a resampling frequency according to an operation speed of the robot body. Thereby, an apparent change that may occur in the signal due to the non-constant speed operation of the robot body can be corrected.

In a maintenance management method according to the present invention, a robot control device executes: a step of controlling operation of a robot body; a step of detecting a signal used for analysis of a feature amount quantitatively indicating a deterioration degree of the robot body that is deteriorated over time as the robot body is operated; a step of determining whether a data section of the detected signal includes a constant speed section that is a data section obtained by a constant speed operation of the robot body and that is equal to or greater than a given section; a step of normalizing, when the data section of the detected signal does not include the constant speed section equal to or greater than the given section, a signal in a non-constant speed section which is a data section obtained by a non-constant speed operation of the robot body in the data section of the detected signal; a step of analysing, when the data section of the detected signal includes the constant speed section equal to or greater than the given section, the feature amount quantitatively indicating the deterioration degree of the robot body based on the signal in the constant speed section, and analysing, when the data section of the detected signal does not include the constant speed section equal to or greater than the given section, the feature amount quantitatively indicating the deterioration degree of the robot body based on the normalized signal in the non-constant speed section; and a step of estimating a remaining life of the robot body based on the analysed feature amount.

Accordingly, whether the constant speed section included in the data section of the detected signal is equal to or greater than the given section is determined, and when the constant speed section is shorter than the given section, the data section to be normalized can be limited to a necessary range by normalizing the signal in the non-constant speed section. In addition, when the constant speed section included in the data section of the detected signal is equal to or greater than the given section, the deterioration degree of the robot body can be precisely evaluated based on the signal in the constant speed section in which an apparent change caused by the non-constant speed operation of the robot body does not occur.

A maintenance management program according to the present invention enables a robot control device to execute: a step of controlling operation of a robot body; a step of detecting a signal used for analysis of a feature amount quantitatively indicating a deterioration degree of the robot body that is deteriorated over time as the robot body is operated; a step of determining whether a data section of the detected signal includes a constant speed section that is a data section obtained by a constant speed operation of the robot body and that is equal to or greater than a given section; a step of normalizing, when the data section of the detected signal does not include the constant speed section equal to or greater than the given section, a signal in a non-constant speed section which is a data section obtained by a non-constant speed operation of the robot body in the data section of the detected signal; a step of analysing, when the data section of the detected signal includes the constant speed section equal to or greater than the given section, the feature amount quantitatively indicating the deterioration degree of the robot body based on the signal in the constant speed section, and analysing, when the data section of the detected signal does not include the constant speed section equal to or greater than the given section, the feature amount quantitatively indicating the deterioration degree of the robot body based on the normalized signal in the non-constant speed section; and a step of estimating a remaining life of the robot body based on the analysed feature amount. Accordingly, whether the constant speed section included in the data section of the detected signal is equal to or greater than the given section is determined, and when the constant speed section is shorter than the given section, the data section to be normalized can be limited to a necessary range by normalizing the signal in the non-constant speed section. In addition, when the constant speed section included in the data section of the detected signal is equal to or greater than the given section, the deterioration degree of the robot body can be precisely evaluated based on the signal in the constant speed section in which an apparent change caused by the non-constant speed operation of the robot body does not occur.

According to the present invention, the deterioration degree of the robot body can be precisely evaluated.

DESCRIPTION OF THE EMBODIMENTS

Figure 1:
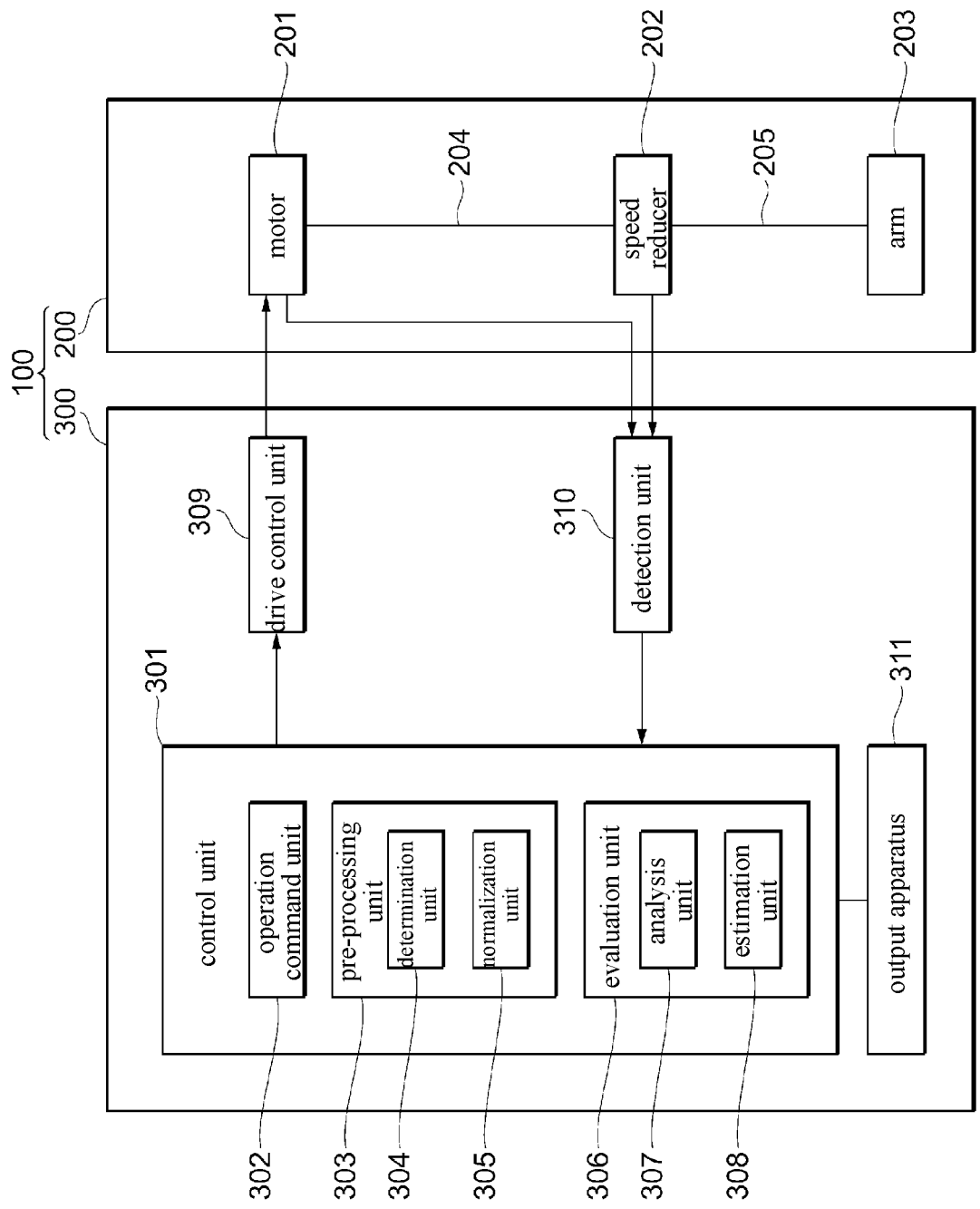
FIG. 1 is an illustration diagram showing an example of a configuration of a robot according to an embodiment of the present invention.

An embodiment according to one aspect of the present invention is described below based on the drawings. The embodiment of the present invention is intended for facilitating the understanding of the present invention and not for limiting interpretation of the present invention. The present invention can be modified or improved without departing from the spirit thereof, and the present invention also includes equivalents thereof. Moreover, the same reference numerals denote the same components, and repeated description is omitted.

Application Example

First, an application example of the present invention is described with reference to FIG. 1. FIG. 1 shows an example of a configuration of a robot 100 according to the embodiment of the present invention. The robot 100 may include, for example, a robot body 200 that autonomously operates as a manipulator, and a robot control device 300 that controls the operation of the robot body 200. A specific example of the robot 100 may be a vertical articulated robot, a horizontal articulated robot, an orthogonal robot, a parallel link robot, or the like. The robot 100 can be used for any purpose such as assembly of components, transportation, painting, inspection, polishing, cleaning, or the like.

The robot main body 200 may include, for example, an arm 203 that operates as a manipulator, a motor 201 that rotates a rotation shaft 204 that transmits power to the arm 203, and a speed reducer 202 that reduces a rotation speed of the rotation shaft 204 to increase the torque and transmits power having the increased torque to the arm 203 through an output shaft 205. Here, the rotation shaft 204 is, for example, an output shaft of the motor 201. For convenience of description, FIG. 1 illustrates a case where the number of shafts (the number of joints) of the robot body 200 is 1, but the number of shafts may be two or more (for example, four to seven shafts).

The robot control device 300 may include, for example, an operation command unit 302 that generates an operation command of the motor 201, a drive control unit 309 that controls drive of the motor 201 in response to the operation command from the operation command unit 302, a detection unit 310 that detects a signal used for analysis of a feature amount quantitatively indicating a deterioration degree of the robot body 200 that is deteriorated over time as the robot body 200 is operated, a pre-processing unit 303 that performs pre-processing on the detected signal, and an evaluation unit 306 that evaluates the deterioration degree of the robot body 200 based on the pre-processed signal. The signal used for the analysis of the feature amount quantitatively indicating the deterioration degree of the robot body 200 may be vibration (for example, amplitude and frequency of a vibration component) or sound (for example, amplitude and frequency of sound) generated from a component (for example, a speed reducer 202) of the robot body 200, or a current command value (for example, amplitude and frequency of the current command value) of the motor 201.

In the specification, in the data section of the signal detected by the detection unit 310 during the operation of the robot body 200, the data section obtained by a constant speed operation (uniform speed operation) of the robot body 200 is referred to as a "constant speed section", and the data section obtained by a non-constant speed operation (acceleration operation or deceleration operation) of the robot body 200 is referred to as a "non-constant speed section". The constant speed operation of the robot body 200 may be considered to be, for example, a motion (a motion that can be regarded as a substantially constant speed motion) of the arm 203 when the rotation speed of the motor 201 is equal to or higher than a first threshold value and an absolute value of a temporal change of the rotation speed of the motor 201 is less than a second threshold value. The non-constant speed operation of the robot body 200 may be considered to be, for example, a motion (acceleration motion or deceleration motion) of the arm 203 when the rotation speed of the motor 201 is equal to or higher than the first threshold value and the absolute value of the temporal change of the rotation speed of the motor 201 is equal to or higher than the second threshold value. The non-constant speed sections can be classified into an "acceleration section" which is a data section obtained by the acceleration operation of the robot body 200 and a "deceleration section" which is a data section obtained by the deceleration operation of the robot body 200. Moreover, the data section obtained when the rotation speed of the motor 201 is less than the first threshold value is referred to as a "stop section".

The pre-processing unit 303 may include: a determination unit 304 that determines whether the data section of the signal detected by the detection unit 310 includes a constant speed section equal to or greater than a given section; and a normalization unit 305 that normalizes, when the data section of the signal detected by the detection unit 310 does not include the constant speed section equal to or greater than the given section, a signal in the non-constant speed section in the data section of the signal detected by the detection unit 310. The normalization unit 305 may resample the signal in the non-constant speed section at a resampling frequency according to an operation speed (for example, a rotation speed of the motor 201) of the robot body 200. Here, the "given section" may be, for example, a data section required to detect at least one period of a periodic change in the feature amount that is linked to the operation of the robot body 200. Thereby, information of the feature amount necessary for evaluating the deterioration degree can be obtained without any shortage.

The evaluation unit 306 may include: an analysis unit 307 that analyses, based on the signal detected by the detection unit 310, the feature amount quantitatively indicating the deterioration degree of the robot body 200; and an estimation unit 308 that estimates a remaining life of the robot body 200 based on the feature amount analysed by the analysis unit 307. When the data section of the signal detected by the detection unit 310 includes the constant speed section equal to or greater than the given section, the analysis unit 307 analyses, based on the signal in the constant speed section, the feature amount quantitatively indicating the deterioration degree of the robot body 200. Because the signal in the constant speed section has no apparent change caused by the non-constant speed operation of the robot body 200, the feature amount can be accurately analysed. Particularly, because the constant speed section equal to or greater than the given section includes data of the feature amount sufficient for detecting at least one period of the periodic change of the feature amount that is linked to the operation of the robot body 200, the deterioration degree can be precisely evaluated. When the data section of the signal detected by the detection unit 310 does not include the constant speed section equal to or greater than the given section, the analysis unit 307 analyses, based on the normalized signal in the non-constant speed section, the feature amount quantitatively indicating the deterioration degree of the robot body 200. Because the normalized signal in the non-constant speed section is corrected for the apparent change caused by the non-constant speed operation of the robot body 200, the feature amount can be accurately analysed. In addition, when the constant speed section is shorter than the given section, the data section to be normalized can be limited to a necessary range by normalizing the signal in the non-constant speed section.

For example, the analysis unit 307 performs frequency-analysis on a signal of a vibration component detected by the detection unit 310, and when amplitude of the vibration component having a specific frequency is significantly larger than amplitude of a vibration component having another frequency by a threshold value or more, information indicating the amplitude of the vibration component having the specific frequency may be regarded as the feature amount quantitatively indicating the deterioration degree of the robot body 200. For example, the analysis unit 307 performs frequency-analysis on a signal of sound detected by the detection unit 310, and when amplitude of the sound having a specific frequency is significantly larger than amplitude of sound having another frequency by a threshold value or more, information indicating the amplitude of the sound having the specific frequency may be regarded as the feature amount quantitatively indicating the deterioration degree of the robot body 200. For example, the analysis unit 307 performs frequency-analysis on a signal having a current command value detected by the detection unit 310, and when amplitude of the current command value having a specific frequency is significantly larger than amplitude of a current command value having another frequency by a threshold value or more, information indicating the amplitude of the current command value having the specific frequency may be regarded as the feature amount quantitatively indicating the deterioration degree of the robot body 200. As the frequency analysis, for example, fast Fourier transform may be used.

Moreover, the robot control device 300 may include, for example, a control unit 301 having a microcomputer, and functions of the operation command unit 302, the pre-processing unit 303 and the evaluation unit 306 may be realized by an information processing function of the microcomputer of the control unit 301.

Figure 2:
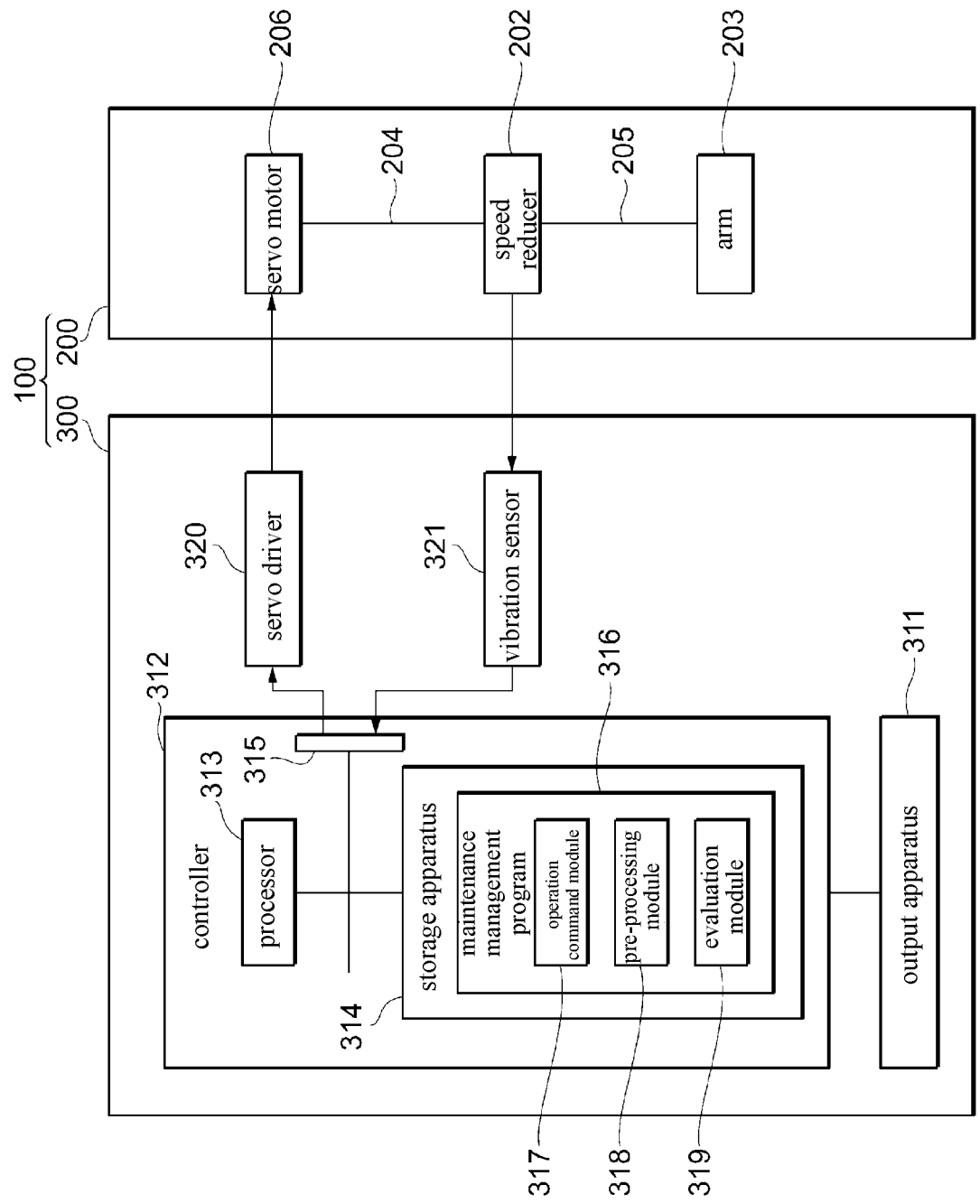
FIG. 2 is an illustration diagram showing an example of a hardware configuration of the robot according to the embodiment of the present invention.

The robot control device 300 may further include an output apparatus 311 that outputs information indicating the remaining life of the robot body 200. The output apparatus 311 may be a display apparatus (for example, a flat panel display such as a liquid crystal display or the like) that conveys the remaining life through visually recognizable information such as characters or symbols, or an acoustic apparatus (for example, a speaker apparatus) that conveys the remaining life through auditorily recognizable information such as an acoustic signal or the like. The output apparatus 311 may be a communication apparatus that transmits information indicating the remaining life of the robot body 200 via a wired channel or a wireless channel. The destination of the information indicating the remaining life may be, for example, a communication terminal of a user (for example, a mobile communication terminal called a smartphone, a smart watch, or a tablet terminal, or a personal computer having Hardware Configuration Next, an example of a hardware configuration of the robot 100 is described focusing on FIG. 2 and referring to FIG. 1 appropriately.

The robot body 200 includes, as an example of the motor 201, a servo motor 206 with an encoder which detects an angle position of the rotation shaft 204.

The robot control device 300 includes a controller 312 as an example of the control unit 301.

The controller 312 may be a microcomputer including, for example, a processor 313, a storage apparatus 314, and an input/output interface 315 as hardware resource. The storage apparatus 314 may store a maintenance management program 316 for executing the maintenance management method according to the embodiment of the present invention, and the maintenance management program 316 may include plural software modules (for example, an operation command module 317, a pre-processing module 318, and an evaluation module 319). The storage apparatus 314 is, for example, a computer-readable recording medium such as a semiconductor memory, a disk medium, or the like.

The operation command module 317 is interpreted and executed by the processor 313, and the hardware resources of the controller 312 and the operation command module 317 cooperate to realize the function of the operation command unit 302. The pre-processing module 318 is interpreted and executed by the processor 313, and the hardware resources of the controller 312 and the pre-processing module 318 cooperate to realize the function of the pre-processing unit 303. The pre-processing module 318 may include a sub module for realizing the function of the determination unit 304 and a sub module for realizing the function of the normalization unit 305. The evaluation module 319 is interpreted and executed by the processor 313, and the hardware resources of the controller 312 and the evaluation module 319 cooperate to realize the function of the evaluation unit 306. The evaluation module 319 may include a sub module for realizing the function of the analysis unit 307 and a sub module for realizing the function of the estimation unit 308. Accordingly, the functions of the operation command unit 302, the pre-processing unit 303, and the evaluation unit 306 may be realized by cooperation between the hardware resources of the controller 312 and the maintenance management program 316, or may be realized using dedicated hardware resources (for example, an application specific integrated circuit (ASIC), a field programmable gate array (FPGA), or the like) or firmware.

The robot control device 300 includes a servo driver 320 as an example of the drive control unit 309. The robot control device 300 includes, as an example of the detection unit 310, a vibration sensor 321 that detects a vibration component generated from a component of the robot body 200 (for example, the speed reducer 202).

Moreover, the speed reducer 202 may include, for example, a bearing mechanism or a gear mechanism in which the rotation is interlocked with rotation of the rotation shaft 204, and vibration may occur due to aging deterioration of the bearing mechanism or the gear mechanism. The cause of the vibration is not limited to the aging deterioration of the speed reducer 202. For example, the vibration may be caused by aging deterioration of components that are interlocked with the rotation of the rotation shaft 204. As the speed reducer 202, for example, a wave gear apparatus called Harmonic Drive (registered trademark) may be used.

Maintenance Management Method

Figure 3:
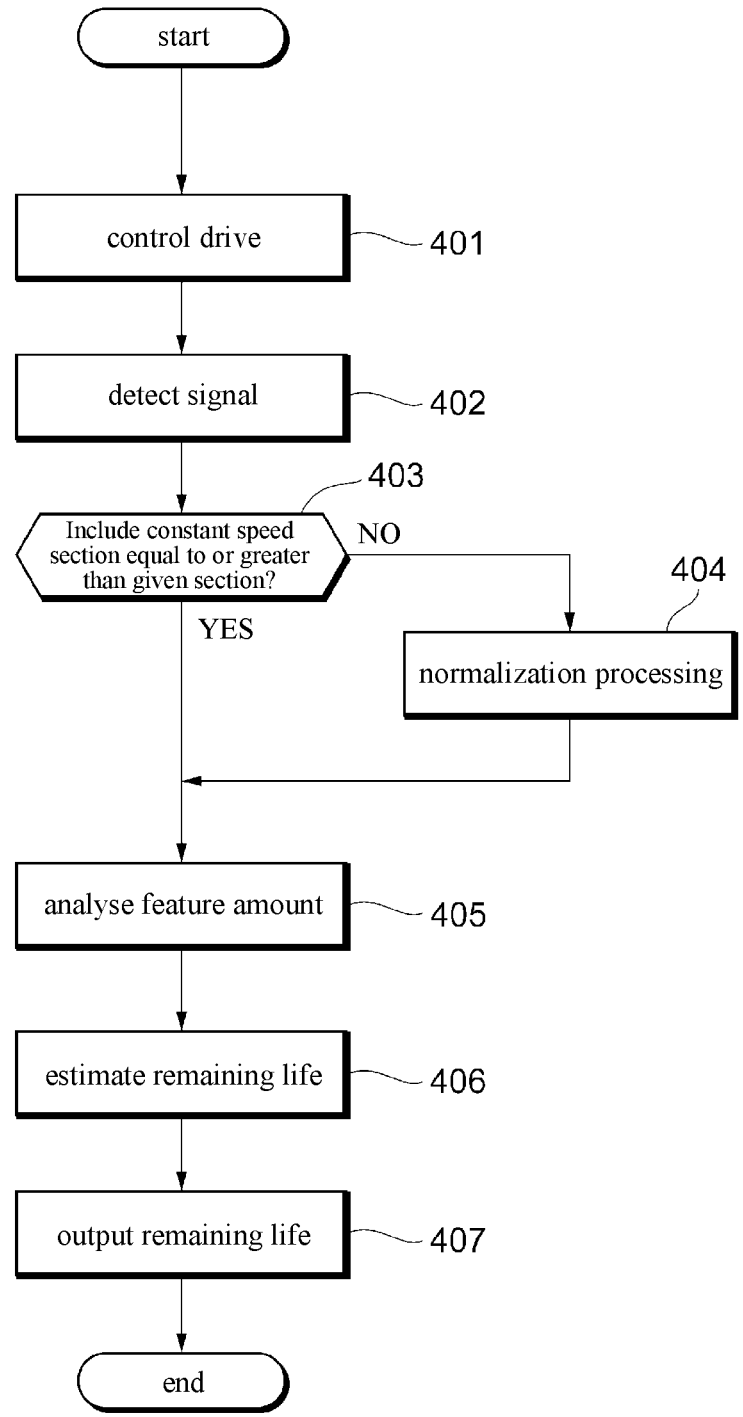
FIG. 3 is a flowchart showing an example of a maintenance management method according to the embodiment of the present invention.

Next, an example of the maintenance management method according to the embodiment of the present invention is described with reference to FIG. 3.

In step 401, the servo driver 320 controls drive of the robot body 200 by controlling drive of the servo motor 206 in response to an operation command from the operation command module 317.

In step 402, the vibration sensor 321 detects the signal of the vibration component (for example, the amplitude, the frequency, or the like of the vibration component) used for the analysis of the feature amount quantitatively indicating the deterioration degree of the robot body 200 that is deteriorated over time as the robot body 200 is operated.

In step 403, the pre-processing module 318 determinates whether the data section of the signal detected in step 402 includes a constant speed section equal to or greater than a given section. Whether the data section of the signal includes the constant speed section equal to or greater than the given section can be determined from a change per unit time in an angle position of the rotation shaft 204 output from the encoder of the servo motor 206. Here, the given section is, for example, the data section required to detect at least one period of a periodic change in the feature amount that is linked to the operation of the robot body 200.

In step 404, the pre-processing module 318 normalizes the feature amount of the non-constant speed section in the data section of the signal detected in step 402. Details of the normalization processing are described later.

In step 405, the evaluation module 319 analyses, based on the signal detected in step 402, the feature amount quantitatively indicating the deterioration degree of the robot body 200. When the data section of the signal detected in step 402 includes the constant speed section equal to or greater than the given section, the evaluation module 319 analyses, based on the signal in the constant speed section, the feature amount quantitatively indicating the deterioration degree of the robot body 200. When the data section of the signal detected in step 402 does not include the constant speed section equal to or greater than the given section, the evaluation module 319 analyses, based on the signal in the non-constant speed section normalized in step 404, the feature amount quantitatively indicating the deterioration degree of the robot body 200.

In step 406, the evaluation module 319 estimates the remaining life of the robot body 200 based on the feature amount analysed in step 405. In the specification, a state in which a normal operation of the robot body 200 is significantly hindered is referred to as a "malfunction", and the time when the malfunction occurs is referred to as a "malfunction time". In addition, a threshold value which is set to the same value as a magnitude of a feature amount when a significant hindrance to the normal operation of the robot body 200 begins to occur is referred to as a "malfunction threshold value". For example, the evaluation module 319 may estimate, from a tendency of a change over time in the feature amount, the malfunction time at which the feature amount is expected to exceed the malfunction threshold value. The evaluation module 319 may estimate duration from a present point to the malfunction time as the remaining life.

In step 407, the output apparatus 311 outputs information indicating the remaining life estimated in step 406.

Moreover, steps 405 and 406 correspond to processing for evaluating the deterioration degree of the robot body 200, and steps 403 and 404 correspond to pre-processing performed prior to evaluation of the deterioration degree. Steps 401 to 407 may be periodically repeated when the robot body 200 is operating. An execution frequency of step 405 and an execution frequency of step 406 may be the same or different. For example, the execution frequency of step 405 may be, for example, once every 10 minutes, and the execution frequency of step 406 may be, for example, once a day.

Figure 4:
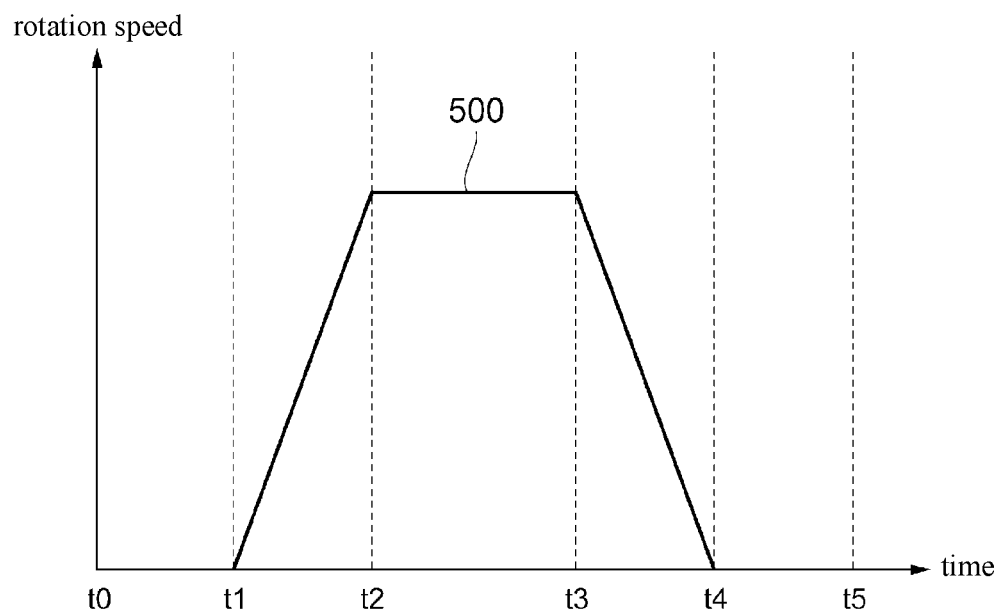
FIG. 4 is an illustration diagram showing an example of a rotation speed profile of a servo motor according to the embodiment of the present invention.

FIG. 4 is an illustration diagram showing an example of a rotation speed profile 500 of the servo motor 206 when the robot body 200 is operated. The horizontal axis of FIG. 4 represents time and the vertical axis represents a rotation speed. In the specification, the rotation speed profile means a characteristic of temporal change of the rotation speed. The section from time t0 to time t1 is a stop section. The section from time t1 to time t2 is a non-constant speed section (acceleration section). The section from time t2 to time t3 is a constant speed section. The section from time t3 to time t4 is a non-constant speed section (deceleration section). The section from time t4 to time t5 is a stop section.

Figure 5:
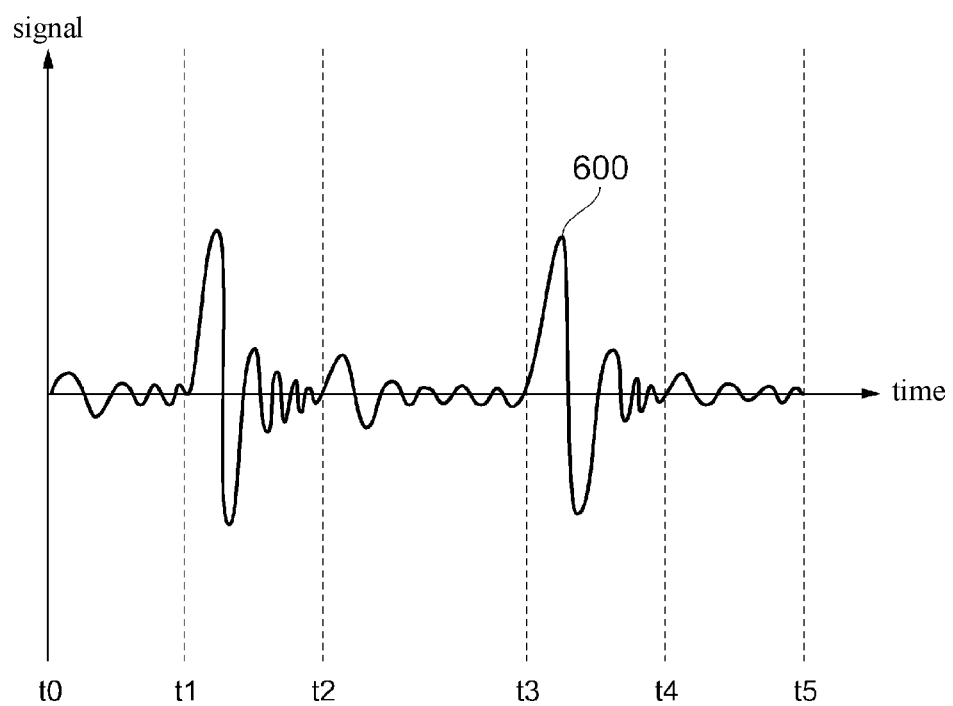
FIG. 5 is an example of a graph showing a temporal change of a feature amount that quantitatively shows a deterioration degree of a robot body according to the embodiment of the present invention.

FIG. 5 is an example of a graph 600 showing a temporal change of the signal (for example, a vibration component generated from the robot body 200) used for the analysis of the feature amount quantitatively indicating the deterioration degree of the robot body 200. The horizontal axis of FIG. 5 represents time, and the vertical axis represents the magnitude of the signal (for example, the amplitude of the vibration component generated from the robot body 200). Times t0 to t5 in FIG. 5 respectively correspond to t0 to t5 in FIG. 4. The faster the rotation speed of the servo motor 206, the more the signal is compressed in the time axis direction, and thus the larger the apparent change that occurs in the signal.

Figure 6:
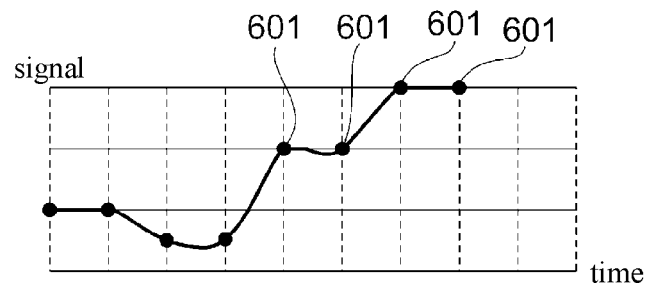
FIG. 6 is an illustration diagram showing an example of normalization processing according to the embodiment of the present invention.
Figure 7:
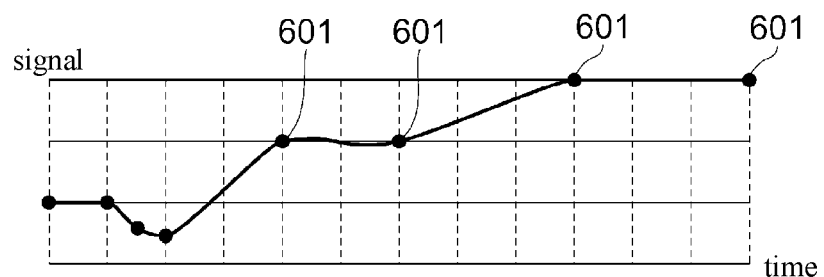
FIG. 7 is an illustration diagram showing an example of normalization processing according to the embodiment of the present invention.
Figure 8:
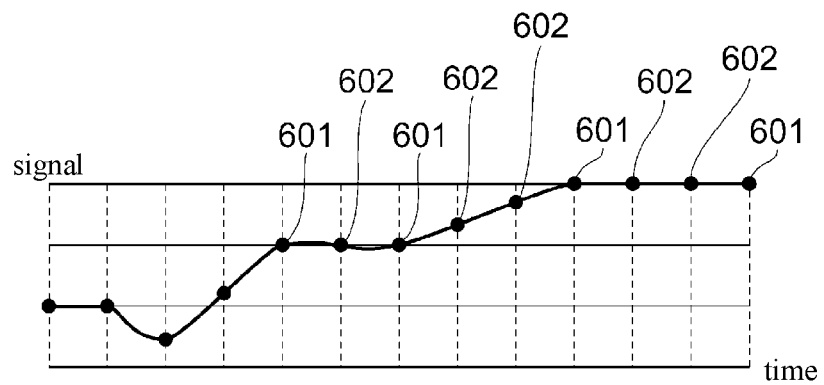
FIG. 8 is an illustration diagram showing an example of normalization processing according to the embodiment of the present invention.

Next, the normalization processing of step 404 is described with reference to FIGS. 6 to 8. The horizontal axis of FIGS. 6 to 8 represents time, and the vertical axis represents the magnitude of the signal (for example, the amplitude of the vibration component generated from the robot body 200). Reference sign 601 represents a signal value (for example, an amplitude value of the vibration component generated from the robot body 200) sampled in a part of the non-constant speed section of the graph 600 shown in FIG. 5 (for example, a part of the non-constant speed section from time t1 to time t2). The pre-processing module 318 resamples the signal value 601 at a resampling frequency according to the operation speed of the robot body 200 in a manner of extending the signal value 601 in the time axis direction as the operation speed of the robot body 200 (for example, the rotation speed of the servo motor 206) increases. With this resampling, as shown in FIG. 7, the greater the operation speed of the robot body 200, the longer a time interval between adjacent signal values 601. As shown in FIG. 8, the pre-processing module 318 performs complementary processing to generate complementary data 602 that complements between adjacent signal values 601.

Figure 9:
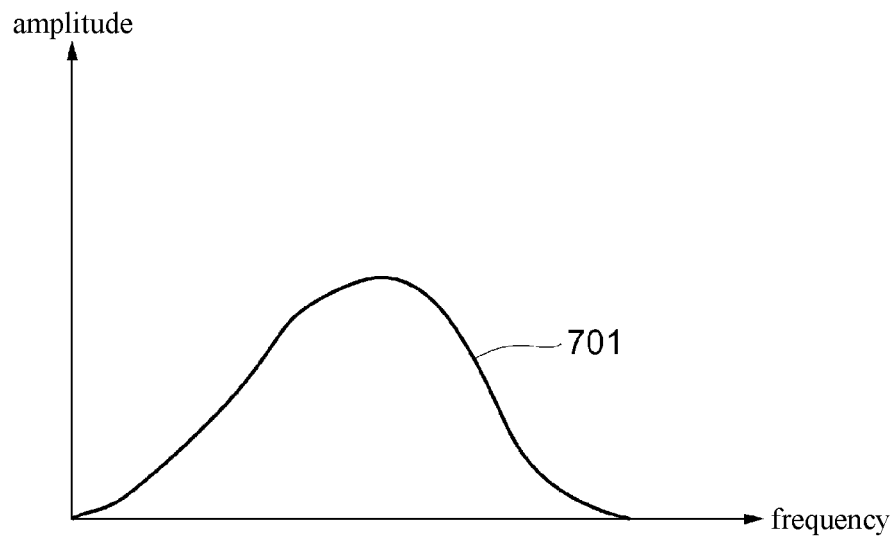
FIG. 9 is an illustration diagram showing a frequency spectrum of a feature amount before normalization processing according to the embodiment of the present invention.
Figure 10:
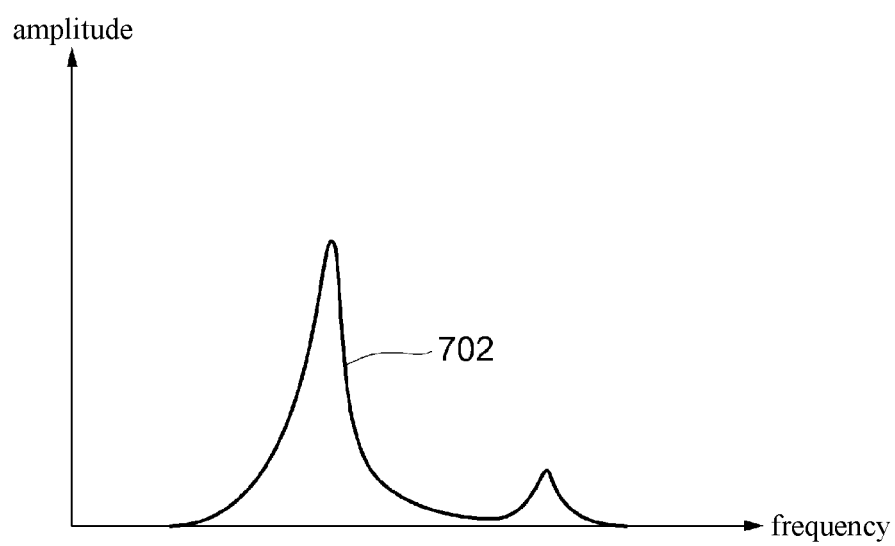
FIG. 10 is an illustration diagram showing a frequency spectrum of a feature amount after normalization processing according to the embodiment of the present invention.

Moreover, FIG. 9 shows a frequency spectrum 701 of a feature amount before the normalization processing of step 404, and FIG. 10 shows a frequency spectrum 702 of a feature amount after the normalization processing of step 404. By performing the normalization processing, a peak appears sharply at a specific frequency (for example, a vibration frequency), and thus the deterioration degree of the robot body can be precisely evaluated based on the feature amount.

Moreover, a time length of the constant speed section from time t2 to time t3 shown in FIG. 5 is desirable to have a time (for example, a time longer than the vibration period) sufficient to detect at least one period of the periodic change of the feature amount linked to the operation of the robot body 200.

In the above description, as an example of the feature amount quantitatively indicating the deterioration degree of the robot body 200, the vibration (for example, the amplitude and frequency of the vibration component) generated from the component of the robot body 200 (for example, the speed reducer 202) is illustrated, but when sound (for example, the amplitude and frequency of the sound) is used as the feature amount, a sound collecting apparatus that collects the sound from the robot body 200 may be used as the detection unit 310. In addition, when the current command value of the motor 201 (for example, the amplitude and frequency of the current command value) is used as the feature amount, a device that acquires the current command of the motor 201 may be used as the detection unit 310. Moreover, a combination of any two or more of vibration, sound, and current command value may be used to analyse the feature amount quantitatively indicating the deterioration degree of the robot body 200.

According to the embodiment, whether the constant speed section included in the data section of the signal used for the analysis of the feature amount quantitatively indicating the deterioration degree of the robot body 200 is equal to or greater than the given section is determined, and when the constant speed section is shorter than the given section, the data section to be normalized can be limited to the necessary range by normalizing the signal in the non-constant speed section. In addition, when the constant speed section included in the data section of the signal is equal to or greater than the given section, the feature amount can be accurately analysed based on the signal in the constant speed section in which an apparent change caused by the non-constant speed operation of the robot body 200 does not occur.

Moreover, the robot 100 according to the embodiment of the present invention is not limited to an industrial robot used for factory automation, and may be, for example, a robot used for the service industry (for example, an operating robot, a medical robot, a cleaning robot, a rescue robot, a security robot, or the like).

APPENDIXES

The whole or part of the embodiment of the present invention can be described as, but not limited to, the following appendixes.

Appendix 1

A robot control device 300, including:
a drive control unit 309 that controls operation of a robot body 200;
a detection unit 310 that detects a signal used for analysis of a feature amount quantitatively indicating a deterioration degree of the robot body 200 that is deteriorated over time as the robot body 200 is operated;
a determination unit 304 that determines whether a data section of the detected signal includes a constant speed section that is a data section obtained by a constant speed operation of the robot body 200 and that is equal to or greater than a given section;
a normalization unit 305 that normalizes, when the data section of the detected signal does not include the constant speed section equal to or greater than the given section, a signal in a non-constant speed section which is a data section obtained by a non-constant speed operation of the robot body 200 in the data section of the detected signal;
an analysis unit 307 that analyses, when the data section of the detected signal includes the constant speed section equal to or greater than the given section, the feature amount quantitatively indicating the deterioration degree of the robot body 200 based on the signal in the constant speed section, and analyses, when the data section of the detected signal does not include the constant speed section equal to or greater than the given section, the feature amount quantitatively indicating the deterioration degree of the robot body 200 based on the normalized signal in the non-constant speed section; and
an estimation unit 308 that estimates a remaining life of the robot body 200 based on the analysed feature amount.

Appendix 2

The robot control device 300 according to Appendix 1, wherein
the given section is a data section required to detect one period of a periodic change in the feature amount that is linked to the operation of the robot body 200.

Appendix 3

The robot control device 300 according to Appendix 1 or 2, wherein
the normalization unit 305 resamples the signal in the non-constant speed section at a resampling frequency according to an operation speed of the robot body 200.

Appendix 4

A maintenance management method in which a robot control device executes:
step 401 of controlling operation of a robot body 200;
step 402 of detecting a signal used for analysis of a feature amount quantitatively indicating a deterioration degree of the robot body 200 that is deteriorated over time as the robot body 200 is operated;
step 403 of determining whether a data section of the detected signal includes a constant speed section that is a data section obtained by a constant speed operation of the robot body 200 and that is equal to or greater than a given section;
step 404 of normalizing, when the data section of the detected signal does not include the constant speed section equal to or greater than the given section, a signal in a non-constant speed section which is a data section obtained by a non-constant speed operation of the robot body 200 in the data section of the detected signal;
step 405 of analysing, when the data section of the detected signal includes the constant speed section equal to or greater than the given section, the feature amount quantitatively indicating the deterioration degree of the robot body 200 based on the signal in the constant speed section, and analysing, when the data section of the detected signal does not include the constant speed section equal to or greater than the given section, the feature amount quantitatively indicating the deterioration degree of the robot body 200 based on the normalized signal in the normalized non-constant speed section; and
step 406 of estimating a remaining life of the robot body 200 based on the analysed feature amount.

Appendix 5

A maintenance management program 316 which enables a robot control device 300 to execute:
step 401 of controlling operation of a robot body 200;
step 402 of detecting a signal used for analysis of a feature amount quantitatively indicating a deterioration degree of the robot body 200 that is deteriorated over time as the robot body 200 is operated;
step 403 of determining whether a data section of the detected signal includes a constant speed section that is a data section obtained by a constant speed operation of the robot body 200 and that is equal to or greater than a given section;
step 404 of normalizing, when the data section of the detected signal does not include the constant speed section equal to or greater than the given section, a signal in a non-constant speed section which is a data section obtained by a non-constant speed operation of the robot body 200 in the data section of the detected signal;
step 405 of analysing, when the data section of the detected signal includes the constant speed section equal to or greater than the given section, the feature amount quantitatively indicating the deterioration degree of the robot body 200 based on the signal in the constant speed section, and analysing, when the data section of the detected signal does not include the constant speed section equal to or greater than the given section, the feature amount quantitatively indicating the deterioration degree of the robot body 200 based on the normalized signal in the non-constant speed section; and
step 406 of estimating a remaining life of the robot body 200 based on the analysed feature amount.

What is claimed is:
1. A robot control device, comprising:
a servo driver that controls operation of a robot body, wherein the robot body includes a speed reducer and a motor coupled to the speed reducer, and the servo driver controls the operation of the robot body through the motor driving the speed reducer;
a sensor coupled to the speed reducer and configured to detect a signal used for analysis of a feature amount quantitatively indicating a deterioration degree of the robot body that is deteriorated over time as the robot body is operated, wherein the feature amount includes a first feature amount and a second feature amount; and a processor configured to:

determine a data section of the detected signal to be a constant speed section that is a data section obtained by a constant speed operation of the robot body when the data section of the detected signal has a period that is equal to or greater than at least one period of a periodic change in the feature amount that is linked to the operation of the robot body, and determine the data section of the detected signal to be a non-constant speed section that is a data section obtained by a non-constant speed operation of the robot body when the data section of the detected signal has a period that is less than the at least one period of the periodic change in the feature amount that is linked to the operation of the robot body;

normalize, when the data section of the detected signal determined to be non-constant speed section, the first feature amount of the non-constant speed section in the data section of the detected signal;

analyse, when the data section of the detected signal is determined as the constant speed section, the second feature amount quantitatively indicating the deterioration degree of the robot body based on the constant speed section in the data section of the detected signal, and analyse, when the data section of the detected signal is determined as the non-constant speed section, the normalized first feature amount quantitatively indicating the deterioration degree of the robot body based on the non-constant speed section in the data section of the detected signal; and estimate a remaining life of the robot body based on the analysed feature amount obtained during the constant speed operation and non-constant speed operation of the robot body.

2. The robot control device according to claim 1, wherein the processor is further configured to:

resample the signal in the non-constant speed section at a resampling frequency according to an operation speed of the robot body.

3. The robot control device according to claim 1, wherein the detected signal is current command value of a motor that drives the robotic body.

4. The robot control device according to claim 1, wherein the detected signal is a sound signal produced by a movement of the robotic body during the constant speed operation and the non-constant speed operation.

5. The robot control device according to claim 1, wherein the constant speed operation of the robot body is a motion of the arm body when a rotation speed of a motor is equal to or greater than a first threshold value, and an absolute value of a temporal change of the rotation speed of the motor is less than a second threshold value, and the non-constant speed operation of the robot body is a motion of the arm body when the rotation speed of the motor is equal to or greater than the first threshold value and the absolute value of the temporal change of the rotation speed of the motor is equal to or greater than the second threshold value.

6. A maintenance management method in which a robot control device executes:

a step of controlling operation of a robot body, wherein the robot body includes a speed reducer and a motor coupled to the speed reducer, and the operation of the robot body is controlled by a servo driver through the motor driving the speed reducer;

a step of detecting a signal used for analysis of a feature amount quantitatively indicating a deterioration degree of the robot body that is deteriorated over time as the robot body is operated, wherein the feature amount includes a first feature amount and a second feature amount;

a step of determining a data section of the detected signal to be a constant speed section that is a data section obtained by a constant speed operation of the robot body when the data section of the detected signal has a period that is equal to or greater than at least one period of a periodic change in the feature amount that is linked to the operation of the robot body;

a step of determine the data section of the detected signal to be a non-constant speed section that is a data section obtained by a non-constant speed operation of the robot body when the data section of the detected signal has a period that is less than the at least one period of the periodic change in the feature amount that is linked to the operation of the robot body;

a step of normalizing, when the data section of the detected signal determined to be non-constant speed section, the first feature amount of the non-constant speed section in the data section of the detected signal;

a step of analysing, when the data section of the detected signal is determined as the constant speed section, the second feature amount quantitatively indicating the deterioration degree of the robot body based on the constant speed section in the data section of the detected signal, and analysing, when the data section of the detected signal is determined as the non-constant speed section, the normalized first feature amount quantitatively indicating the deterioration degree of the robot body based on the non-constant speed section in the data section of the detected signal; and a step of estimating a remaining life of the robot body based on the analysed feature amount obtained during the constant speed operation and non-constant speed operation of the robot body.

7. A non-transitory computer readable recording medium storing a maintenance management program which enables a robot control device to execute:

a step of controlling operation of a robot body, wherein the robot body includes a speed reducer and a motor coupled to the speed reducer, and the operation of the robot body is controlled by a servo driver through the motor driving the speed reducer;

a step of detecting a signal used for analysis of a feature amount quantitatively indicating a deterioration degree of the robot body that is deteriorated over time as the robot body is operated, wherein the feature amount includes a first feature amount and a second feature amount;

a step of determining a data section of the detected signal to be a constant speed section that is a data section obtained by a constant speed operation of the robot body when the data section of the detected signal has a period that is equal to or greater than at least one period of a periodic change in the feature amount that is linked to the operation of the robot body;

a step of determine the data section of the detected signal to be a non-constant speed section that is a data section obtained by a non-constant speed operation of the robot body when the data section of the detected signal has a period that is less than the at least one period of the periodic change in the feature amount that is linked to the operation of the robot body;

a step of normalizing, when the data section of the detected signal determined to be non-constant speed section, the first feature amount of the non-constant speed section in the data section of the detected signal;

a step of analysing, when the data section of the detected signal is determined as the constant speed section, the second feature amount quantitatively indicating the deterioration degree of the robot body based on the constant speed section in the data section of the detected signal, and analysing, when the data section of the detected signal is determined as the non-constant speed section, the normalized first feature amount quantitatively indicating the deterioration degree of the robot body based on the non-constant speed section in the data section of the detected signal; and a step of estimating a remaining life of the robot body based on the analysed feature amount obtained during the constant speed operation and non-constant speed operation of the robot body.

\* \* \* \* \*